United States Patent [19]

Rosenbaum

[11] Patent Number: 5,223,206
[45] Date of Patent: Jun. 29, 1993

[54] METHOD FOR PRODUCING HEAT TREATED COMPOSITE NUCLEAR FUEL CONTAINERS

[75] Inventor: Herman S. Rosenbaum, Fremont, Calif.

[73] Assignee: General Electric Company, San Jose, Calif.

[21] Appl. No.: 894,887

[22] Filed: Jun. 8, 1992

[51] Int. Cl.⁵ .............................................. G21C 3/20
[52] U.S. Cl. ................................. 376/261; 376/417; 148/672
[58] Field of Search .............. 376/261, 260, 417, 416, 376/414; 976/DIG. 43, DIG. 44, DIG. 53; 29/906; 420/422; 148/421, 672; 228/184

[56] References Cited

U.S. PATENT DOCUMENTS

| | | | |
|---|---|---|---|
| 4,390,497 | 6/1983 | Rosenbaum et al. | 376/417 |
| 4,573,629 | 3/1986 | Imahashi et al. | 228/173.2 |
| 4,863,679 | 9/1989 | Imahashi et al. | 376/417 |

*Primary Examiner*—Daniel D. Wasil
*Attorney, Agent, or Firm*—John S. Beulick

[57] ABSTRACT

An improved procedure for producing composite constructed nuclear fuel containers for service in water cooled nuclear fission reactors is disclosed. The improved production procedure maximizes the advantageous characteristics of the respective components of the composite unit. The procedure of the invention comprises heat treating the two components of a tube stock and liner stock separately prior to their assembly.

8 Claims, No Drawings

METHOD FOR PRODUCING HEAT TREATED COMPOSITE NUCLEAR FUEL CONTAINERS

FIELD OF THE INVENTION

This invention relates to an improvement in the manufacture of composite constructed nuclear fuel containers for service in water cooled nuclear fission reactors, such as, for example, the fuel elements disclosed in U.S. Pat. No. 4,200,492, issued Apr. 29, 1980; and U.S. Pat. No. 4,372,817, issued Feb. 8, 1983, and related disclosures cited therein and available in the fuel area of the nuclear literature.

BACKGROUND OF THE INVENTION

Nuclear fuel containers are subject to leakage failures attributable to corrosion, in particular a phenomenon defined in this technology as stress corrosion cracking, an occurrence which is primarily induced or accelerated by abrupt or rapid reactor power increases. Composite nuclear fuel containers, or fuel elements, have been introduced and frequently employed in power generating, commercial water cooled nuclear fission reactor plants to cope with this shortcoming of stress corrosion cracking. Composite nuclear fuel containers comprise a generally conventional tubular container, constructed of a zirconium alloy, stainless steel, aluminum, or other suitable alloy of the art, provided with an internal lining which functions as a protective barrier, and is composed of a metal having increased resistance to intergranular stress corrosion cracking, or other forms of destructive attack. The barrier linings of the art comprise a variety of metals and alloys, including zirconium metal of substantial purity, for example less than about 5000 parts per million impurities, copper, molybdenum, tungsten, rhenium, niobium and alloys thereof. Examples of such protective metal barrier linings for nuclear fuel tubular containers comprise U.S. Pat. No. 4,200,492, issued Apr. 29, 1980; U.S. Pat. No. 4,372,817, issued Feb. 8, 1983; U.S. Pat. No. 4,390,497, issued Jun. 28, 1983; U.S. Pat. No. 4,445,942, issued May 1, 1984; U.S. Pat. No. 4,659,540, issued Apr. 21, 1987; U.S. Pat. No. 4,942,016, issued Jul. 17, 1990; and U.S. Pat. No. 4,986,957, issued Jan. 22, 1991.

Typical composite fuel containers of the art, comprising a tubular containing having a metal liner providing an internal barrier layer metallurgically bonded to its inner surface, are produced by inserting a section of a large diameter, hollow liner stock unit in close fitting intersurface contact into and through the length of a section of a large diameter tube stock. This composite assembly of large diameter section of tube stock with inserted liner stock is then subjected to a series of circumference reductions with each reduction accompanied by a following heat annealing to reduce the hardness imposed by the cold work distortion of the diameter reduction. Various methods can be used to metallurgically unite the tube and liner components, including explosive bonding, heating under compressive loading to cause diffusion bonding, and extension of the assembly. Detailed examples of methods for producing such composite constructed nuclear fuel containers are given in U.S. Pat. No. 4,390,497, issued Jun. 28, 1983; U.S. Pat. No. 4,200,492, issued Apr. 29, 1980; and U.S. Pat. No. 4,372,817, issued Feb. 8, 1983.

In addition t the conventional annealing heat treatments for the purpose of relieving reduction compression induced stresses in the metal of the reduced composite tube and liner unit, it has become a common practice in this field to subject such nuclear fuel containers to specific modifying heat treatments to enhance or optimize a critical property thereof such as corrosion resistance or ductibility as a means for improving the fuel elements continuing durability. For instance, it is well known to heat treat zirconium metal and its alloys, or components formed thereof, up to a temperature of above the alpha microcrystalline phase of the particular metal composition, or to the alpha plus beta or beta microcrystalline phase, followed by rapid cooling to preserve significnat or critical aspects of the resulting heat induced microstructure state. Such heat treatments are disclosed in detail in the prior art, for example U.S. Pat. No. 2,894,866, issued Jul. 14, 1959; U.S. Pat. No. 4,390,497, issued Jun. 28, 1983; U.S. Pat. No. 4,238,251, issued Dec. 9, 1980; and U.S. Pat. No. 4,576,654, issued Mar. 18, 1986.

Temperatures for producing the various potential microstructure changes and accompanying property modifications disclosed in the literature typically depend upon the exact composition of the metal or alloy, and are essentially a unique condition for each different metal or combination of alloying ingredients. Thus if the temperature conditions to achieve or optimize a particular characteristic in a specific composition is no readily available in the literature, it can be ascertained empirically, note for example U.S. Pat. No. 2,894,866, issued Jul. 14, 1959; and U.S. Pat. No. 4,238, 251, issued Dec. 9, 1980.

The disclosures and contents of all the aforesaid U.S. Letters Patent, and the references cited therein, are incorporated herein by reference.

SUMMARY OF THE INVENTION

This invention comprises an improved method for producing composite constructed nuclear fuel containers for service in water cooled nuclear reactors which enables optimizing desired available characteristics of the respective metal components of the composite fuel containers or elements. The invention includes heat treatment procedures that provides for introducing or enhancing distinctive or unique properties such as corrosion resistance or ductility in each of the several metal components of a composite nuclear fuel element.

DETAILED DESCRIPTION OF THE INVENTION

In accordance with this invention, the two main components of a composite constructed nuclear fuel container, comprising a tubular container component, or tube stock unit for forming same, and a barrier liner or lining stock unit for forming same, each of some what different metal compositions such as a zirconium alloy and a zirconium metal are separately heat treated at optimum conditions for producing specifically desired properties in each prior to the assembly and uniting into a single composite unit.

Thus, the tubular container component, or tube stock unit therefor, is separately heat treated. For example, a unit composed of the commercially available zirconium alloy marketed as zircaloy-2 (U.S. Pat. No. 2,772,964, and No. 4,164,420) can be heated up to about 970° C. uniformly throughout to convert the alpha phase microcrystalline structure of this alloy composition to a substantially alpha plus beta phase structure, and then rapidly cooled to preserve the heat induced structural phase.

Additionally the barrier liner components, or lining stock unit therefor, is also separately heat treated. For example, a unit composed of a relatively pure zirconium metal (U.S. Pat. No. 4,372,817) can be heated up to about 900° C. uniformly throughout to convert the alpha phase microcrystalline structure of this metal composition to a substantially beta phase structure, and then rapidly cooled to preserve the heat induced structural phase.

Following their separate optimized heat treatments, the tubular container component and the barrier liner component, or the stock units therefor, are assembled together and combined by inserting the hollow barrier liner into and through the length of the tubular container. The combined units are then metallurgically bonded by conventional means, such as explosive bonding, into a single integrated composite of a lined tubular container for nuclear fuel.

Typically the separately heat treated components for composite constructed nuclear fuel containers, comprise large diameter container tube stock and liner stock which are assembled into a composite are then reduced together in circumference in at least one and preferably a series of reduction steps repeated until the desired diameter is attained for a fuel container. In accordance with the practice of the art, the composite unit is annealed following each reduction to relieve stresses imposed by the compression of the reductions. Annealing temperatures should be below the previously imposed microstructure modifying heat treating temperatures to preclude reversing the modified microstructure, for example not above about 600° C.

What is claimed is:

1. A method for producing composite constructed nuclear fuel containers for service in water cooled nuclear fission reactors comprising a tubular metal casing of zirconium alloy having a protective lining of zirconium metal covering the inside surface of the casing and metallurgically bonded thereto,
consisting essentially of the steps of:
heat treating a large diameter tube stock consistng of a beta-quench treatment of a zirconium alloy for subsequent reduction in circumference to a size suitable for use as tubular container for nuclear fuel,
heat treating a large diameter hollow liner stock consisting of a beta-quench treatment of zirconium metal for subsequent installation within the tube stock, bonding thereto and reduction therein simultaneous with the tube stock to a composite nuclear fuel container,
assembling the heat treated tube stock and heat treated lining stock with the hollow lining stock inserted in close fitting contact within the tube stock and metallurgically bonding the tube and lining stocks together providing a composite tubular stock unit with the tube stock surrounding the lining stock, and reducing the circumference of the assembled composite tubular stock unit down to a size suitable for service as a lined tubular container for nuclear fuel.

2. The method for producing composite constructed nuclear fuel containers of claim 1, wherein the assembled and bonded composite tubular stock unit is progressively reduced in circumference by means of a sequence of reductions.

3. A method for producing composite constructed nuclear fuel containers for service in water cooled nuclear fission reactors comprising a tubular zirconium alloy casing having a protective lining of a different metal composition covering the inside surface of the zirconium alloy casing and metallurgically bonded thereto,
consisting essentially of the steps of: heat treating a large diameter zirconium alloy tube stock at a temperature of at least about 970° C. for subsequent reduction in circumference to a size suitable for use as tubular container for nuclear fuel,
heat treating a large diameter hollow liner stock at a temperature of at least about 900° C. for subsequent installation within the tube stock, bonding thereto and reduction therein simultaneous with the tube stock to a composite nuclear fuel container,
assembling the heat treated zirconium alloy tube stock and heat treated lining stock with the hollow metal lining stock inserted in close fitting contact within the tube stock surrounding the lining stock, metallurgically bonding the tube and liner stocks together into a composite tubular stock unit, and reducing the circumference of the assembled composite tubular stock unit down to a size suitable for service as a lined tubular container for nuclear fuel and metallurgically bonding the reduced metal lining to the surrounding reduced zirconium alloy tubular container.

4. The method for producing composite constructed nuclear fuel containers of claim 3, wherein the heat treated and assembled composite tubular stock unit is progressively reduced in circumference by means of a sequence of compression reductions.

5. The method for producing composite constructed nuclear fuel containers of claim 3, wherein the large diameter hollow liner stock is composed of zirconium metal.

6. The method for producing composite constructed nuclear fuel containers of claim 5, wherein the heat treatment of the large diameter zirconium alloy tube stock comprises a beta-quench treatment of heating the zirconium alloy to a temperature sufficient to recrystallized the zirconium alloy to its beta phase and then rapidly cooling the thus heated and recrystallized zirconium alloy tube stock.

7. The method for producing composite constructed nuclear fuel containers of claim 5, wherein the heat treatment of the large diameter zirconium metal hollow liner stock comprises a beta-quench treatment of heating zirconium metal to a temperature sufficient to recrystallize the zirconium metal to its beta phase and then rapidly cooling the thus heated and recrystallized zirconium metal liner stock.

8. A method for producing composite constructed nuclear fuel containers for service in water cooled nuclear fission reactors comprising a tubular zirconium alloy casing having a protective lining of a zirconium metal covering the inside surface of the zirconium alloy tubular casing and being metallurgically bonded thereto,
consisting essentially of the steps of:
heat treating a large diameter zirconium alloy tube comprising a beta-quench treatment of heating the zirconium alloy to a temperature sufficient to recrystallize the zirconium alloy to its beta phase of at least about 970° C. and then rapidly cooling the thus heated and recrystallized zirconium alloy tube stock, heat treating a large diameter zirconium metal hollow liner stock comprising a beta-quench treatment of heating the zirconium metal to a temperature sufficient to recrystallize the zirconium metal to its beta phase of at least about 900° C. and then rapidly cooling the thus heated and recrystallized zirconium metal hollow liner stock, assembling the heat treated zirconium alloy tube stock and heat treated lining stock with the hollow zirconium metal lining stock inserted inclose fitting contact within the tube stock, metallurgically bonding the tube and liner stocks providing a composite tubular stock unit with the tube stock surrounding the lining stock, and reducing the circumference of the assembled composite tubular stock unit down to a size suitable for service as a lined tubular container for nuclear fuel in a series of progressive reductions in circumference applied in sequence.

* * * * *